Sept. 29, 1964   R. W. DEUTSCH ETAL   3,151,032
REACTOR CONTROL DEVICE CONTAINING POISON AND FUEL
Filed Dec. 2, 1960   2 Sheets-Sheet 1

INVENTORs:
ROBERT W. DEUTSCH
FRANK BEVILACQUA
BY Eldon H. Luther
ATTORNEY

Sept. 29, 1964   R. W. DEUTSCH ETAL   3,151,032
REACTOR CONTROL DEVICE CONTAINING POISON AND FUEL
Filed Dec. 2, 1960   2 Sheets-Sheet 2

INVENTORS:
ROBERT W. DEUTSCH
FRANK BEVILACQUA
BY
Eldon H. Luther
ATTORNEY

United States Patent Office 3,151,032
Patented Sept. 29, 1964

3,151,032
REACTOR CONTROL DEVICE CONTAINING
POISON AND FUEL
Robert W. Deutsch and Frank Bevilacqua, Clearwater,
Fla., assignors to General Nuclear Engineering Corporation, Dunedin, Fla., a corporation of Delaware
Filed Dec. 2, 1960, Ser. No. 73,440
13 Claims. (Cl. 176—29)

This invention relates generally to a nuclear reactor control device and particularly to an improved control wherein the control device remains within the reactor core and control is effected by internal movement within the core of a neutron poison, to and from a position of low neutron flux and a position of high neutron flux.

It is recognized that the employment of a reactor control which does not necessitate the longitudinal or axial movement of control rods into and out of the core of the reactor has decided advantages in that these longitudinally movable control rods produce non-uniform flux distributions within the reactor core axially thereof and necessitate relatively complicated mechanical mechanisms to produce the required movement of the rod.

The present invention is directed to a control device which includes both a poison and a fuel, i.e. a material of high neutron absorption cross-section and a fissionable material, with these materials extending throughout the length of the device and the device being constructed in such a manner that the neutron poison is movable to and from a region of low neutron flux and a region of high neutron flux within the reactor core.

In addition to providing a simpler mechanical arrangement for moving the control device as well as eliminating axial flux distortions as a result of adjustment of the control, the presence of a poison at all times within the reactor core acts as a safety feature in that it reduces the possibility of a catastrophic accident. This becomes clear when it is considered that a poison can be neglected during the reactor operation because of fuel self-shielding, but during a reactor excursion the fuel can become more transparent because of a neutron spectrum shift and the increased activity can be partly compensated by increased poison absorption without any mechanical movement.

Clumped nuclear fuels have the property of reducing the neutron intensity as a function of penetration into the fuel; this effect is commonly known as self-shielding. The self-shielding is a function of the thermal macroscopic absorption cross-section and the fuel thickness. For fuel elements that possess a large self-shielding, i.e. large macroscopic absorption or quite thick, the presence of a neutron poison in the middle of the fuel has a very small effect on the neutron economy. The movement of this poison from the middle of the fuel to the outside of the fuel element where its surface is exposed to the surface fuel neutron flux will cause a decrease in the reactor reactivity.

Accordingly it is an object of this invention to provide a reactor control device which is to be disposed in the core of the reactor and employing a poison that is adapted to be permanently retained in the core and be movable therewithin.

Other and further objects of the invention will become apparent to those skilled in the art as the description proceeds.

With the aforementioned objects in view, the invention comprises an arrangement, construction and combination of the elements of the inventive organization in such manner as to attain the results desired as hereinafter more particularly set forth in the following detailed description of the invention as shown by the accompanying drawings wherein.

Figure 1:
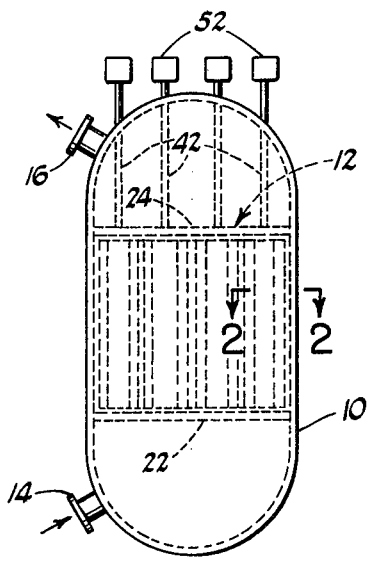
FIG. 1 is a diagrammatic illustration in the nature of a vertical section of a nuclear reactor employing the present invention.
Figure 3:
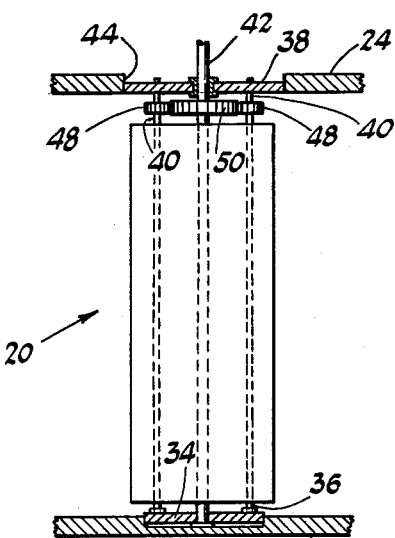
FIG. 3 is an elevational side view of the control device of the invention.
Figure 2:
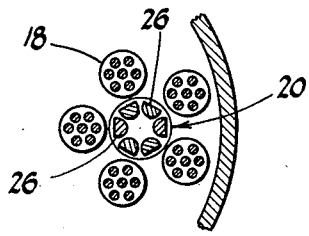
FIG. 2 is a fragmentary illustration taken generally from line 2—2 of FIG. 1 and showing a portion of the reactor core in transverse section.

Referring now to the drawing, wherein like reference characters are used throughout to designate like elements, the preferred employment of the invention depicted therein includes reactor vessel 10 within which is mounted the reactor core 12 with cooling fluid being admitted through inlet 14 and exiting at outlet 16, this cooling fluid passing up through the core to cool the same, as is conventional. The core 12 is comprised of a plurality of fuel assemblies 18 which may be made up of parallelly disposed rods or bars and interspersed among these assemblies are a number of control devices 20. The control device 20 and fuel assemblies 18 extend throughout the length of core 12 and are held in place between the lower retaining grid plate 22 and the upper retaining grid plate 24.

Each of the control devices 20 is comprised of a plurality (six in illustrative organization) of individual elongated control members 26. These control members are semi-circular in transverse section and are made up of a housing or casing 28 of zirconium, stainless steel or the like, and adjacent the inner side of the flat surface of this semi-circular housing member is a layer of material 30, which contains a neutron poison. The remaining portion of the interior of tube 28 is filled with a nuclear fuel 46 such as uranium oxide.

Figure 4:
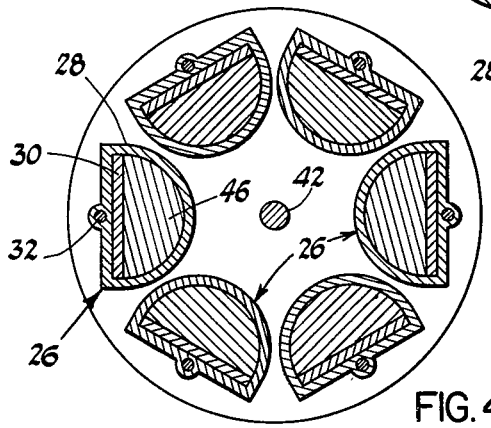
FIG. 4 is a transverse sectional view of this control device.

The several control members in each control device are arranged in a circle as shown in FIG. 4 and each of the members 26 is mounted so that it is rotatable about the axis 32 of its semi-circular cross section. For this purpose a plate 34 is provided at the lower end of the control member and within this plate is journaled the stub shaft 36 which extend from the housing 28 coaxial with axis 32. Similarly arranged at the upper end of the control member is plate 38 which receives stub shaft 40 extending up from housing 28 in coaxial relation with axis 32. The plates 34 and 38 are retained in their proper axial relation with the control elements 26 by means of the centrally disposed shaft 42 with this shaft being rotatably journaled to each of these plates but being prevented from moving axially with relation to the plates. Lower plate 34 is snugly received in a suitable recess provided in grid 22 while upper plate 38 is received within opening 44 in grid plate 24.

Control of the reactivity within the reactor core is provided by rotating the individual elongated members 28 to and from a position where the poison layer 30 faces outwardly and accordingly masks the fuel 46 with respect to the exterior of control device 20 and a position 180° from this poison masking portion and where fuel 46 then masks the poison layer 30 with respect to the exterior of the control device.

Figure 5:
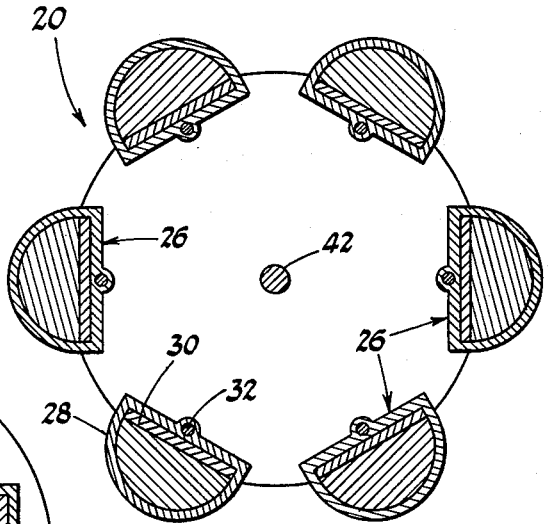
FIG. 5 is a view similar to that of FIG. 4 but showing the control elements rotated 180°.

FIG. 4 shows the control device in the poison masking position while FIG. 5 shows the device in the fuel masking position. By moving the elements 28 from the position disclosed in FIG. 5 to the position disclosed in FIG. 4 the poison 30 is effectively moved from a location of low neutron flux to a position of higher neutron flux. This has the effect in the reactor core of decreasing the reactivity.

The elements 26 may be either individually or simultaneously rotated about axis 32 with means being illustratively shown for effecting simultaneous movement thereof. As embodied this means includes pinion gear 48 secured to stub shaft 40 and meshing with gear 50 which is secured to central shaft 42. This shaft, in turn, extends upwardly through the vessel 10 and is connected to a suitable actuator 52. With this arrangement rotation of shaft 42 simultaneously rotates each of the elements 26 in the same direction and to the same extent about their axis 32. As the elements 26 are moved from the FIG. 5 to the FIG. 4 position the control device will have the effect of progressively decreasing the reactivity in the reactor.

Figure 6:
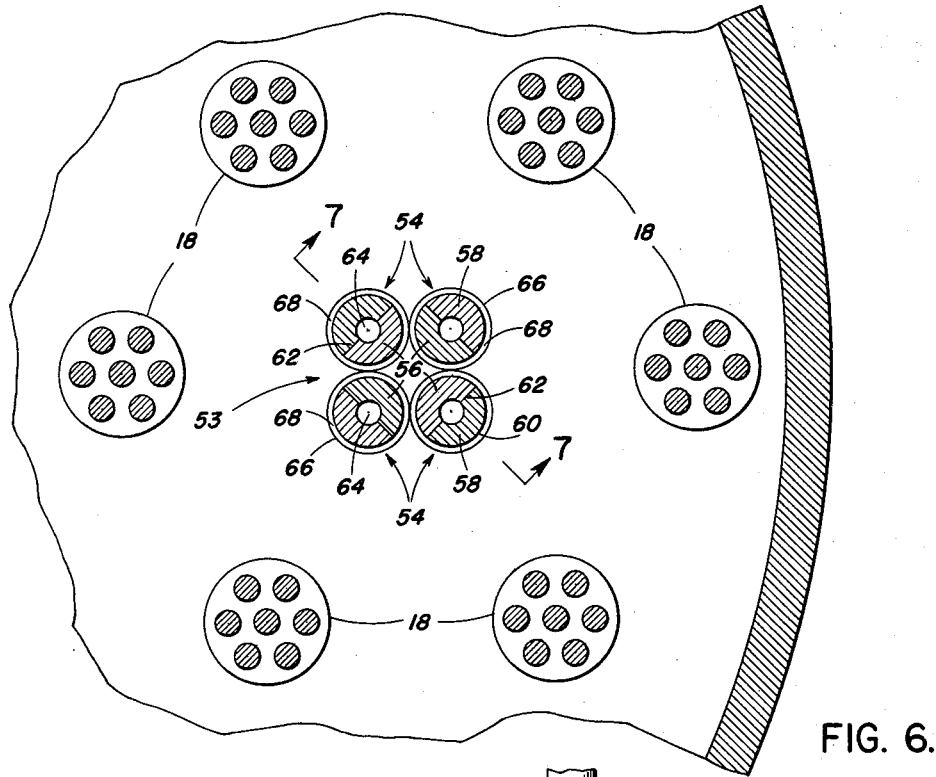
FIG. 6 is a transverse sectional view of a modified form of the control device of the invention.
Figure 7:
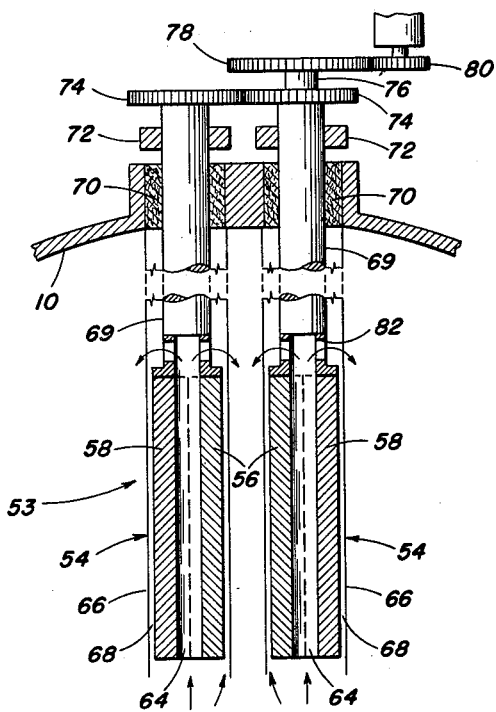
FIG. 7 is a vertical sectional view taken along line 7—7 of FIG. 6 disclosing certain construction details of this modified embodiment.

Referring now to the modified form of the control device of the present invention as disclosed in FIGS. 6 and 7 this device, while operating in the same general manner as the FIGS. 1 through 6 embodiment employs rotatable cylindrical control members in lieu of the previously described members of semi-circular cross section. In this modified embodiment, as illustratively disclosed, there are four cylindrical control members identified generally as 54 and grouped in a cluster, as shown, to form one control device 53. Each of these cylindrical members 54 has its longitudinal axis parallel with the axis of the fuel assemblies 18 which are positioned around the control member as disclosed with there being six such assemblies shown in FIG. 6. Each of the control members includes both a fuel, such as uranium oxide, and a suitable poison with generally half of the cross section of the cylinder containing fuel while the other half contains poison and with the fuel being identified as 56 and the poison identified as 58. This fuel and poison which extends throughout the length of each control member is contained within a suitable housing or shell 60 which is of any structural material of low neutron absorption cross section conventionally used in reactor cores. The fuel 56 and poison 58 are separated by a barrier plate 62.

In order to insure adequate cooling of each of the control members 54, a passageway 64 is provided centrally of each member extending longitudinally therethrough with these passageways being formed by means of a suitable tube positioned centrally within each member. There is disposed about each of the members 54 a sleeve 66 which is in space relation with shell 60, as shown, so as to form an annular passage 68 for the conveyance of a suitable cooling fluid. Accordingly a cooling fluid passage is provided centrally and about each of the members 54.

In the modified organization of FIGS. 6 and 7 the control members 54 are mounted on suitable support rods 69 which extend through the upper end of pressure vessel 10. As embodied each of the support rods is connected with the upper end of one of the members 54 and extends upward through a rotary seal 70 to the exterior of the vessel with the upper end of the rod being received in a suitable bearing 72 and having mounted on its upper extremity one of the gears 74. In the illustrative organization wherein the control device 53 is comprised of four control members 54 the gears 74 at the upper end of each of the control rods 69 is in meshing engagement whereby the rods rotate in unison and to the same angular extent. Extending up from one of the control rods is an extension shaft 76 upon which is mounted gear 78 which engages the drive gear 80 with this drive gear being rotated by a suitable rotor as desired so that the rotative position of the control members in each control device can be positioned as desired. In lieu of thus angularly adjusting the control members in each of the control devices 53 they may be manually and individually adjusted if desired.

By means of mounting the control members 54 in this manner they may extend into the reactor vessel as illustrated in FIG. 7 and need not be mounted between the upper and lower grids of the reactor core but merely may be received in suitable openings provided in the core with the weight of the members being supported by the support rod 69.

In order that coolant passing up through the passageway 60 may pass from the upper end thereof there is provided at the upper end of each of the control members 58 a plurality of laterally disposed passages 82 for the egress of this cooling fluid. The coolant is directed through central passage 64 and the annular passage 68 as indicated by the arrows in FIG. 7.

In the operation of this modified form of the invention the control members of each control device are rotated about their axis between extreme positions where the poison portion of the several members is directed inwardly of the group as disclosed in FIG. 6 and where the fuel portion is so inwardly directed.

Accordingly, it will be appreciated that a control organization has been provided which controls reactivity within the reactor without causing axial flux distortions and with a simple rotary motion being required whereby simple and economical mechanical arrangements may be utilized with the control having a poison that remains in the core of the reactor at all times.

While we have illustrated and described preferred embodiments of our novel organization it is to be understood that such are merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. In an elongated control device for a nuclear reactor a plurality of elongated members symmetrically arranged in side-by-side relation about a central axis and each member of which contains a nuclear fuel on one side and a poison on the other, means for manipulation of each of said members about a longitudinally extending axis to and from a position where the fuel in each member is essentially masked by poison with respect to the exterior of the device and a position where said fuel is unmasked by poison with respect to said exterior.

2. The organization of claim 1 wherein the means for manipulating said members is operative to simultaneously move said members to and from said masked and unmasked positions.

3. A control device for a nuclear reactor comprising a plurality of axially parallel longitudinally extending members arranged generally in side by side relation about a central axis, each of said members being individually pivotable about a longitudinally extending axis parallel with the longitudinal axis of the device to and from a first and a second position, said members containing a fissionable material and a poison so disposed that when said members are in said first position said fissionable material is substantially completely masked by poison from the exterior of the device and when in said second position said poison is substantially completely masked by fuel from the exterior of the device and means for moving said members to and from said first and second positions.

4. A control device for a nuclear reactor comprising a plurality of longitudinally extending parallel members disposed in side by side relation about a central axis, each of said members being mounted for rotation about a longitudinal axis parallel with the longitudinal axis of the device and through an arc of at least 180°, said members being of composite construction having a portion of their transverse area containing a poison and a portion containing a fissionable material with these portions extending longitudinally generally through the length of the member and with these portions disposed so that in one rotative position of the member the fuel portion is located inwardly of the poison portion and another rotative position the fuel portion is located outwardly of the poison, and means for rotating said members.

5. The organization of claim 4 wherein said members are generally semicircular in transverse section and are rotatable about the longitudinal axis of said members.

6. The organization of claim 4 wherein said members are generally circular in transverse section and are rotatable about the longitudinal axis of said members.

7. The organization of claim 6 wherein a central cooling passage is provided extending longitudinally of each of said members.

8. A control device for a nuclear reactor having a plurality of parallel longitudinally extending members the longitudinal axes of which are disposed in a circle about a central axis, each of said members having a semicircular transverse section with each member being rotatable about the axis of the semicircle and with these axes being spaced from each other a distance slightly greater than the diameter of the semicircle, each of said members being of composite construction having a portion of its transverse area contain a fuel and a portion contain a poison with these portions being disposed so when the members are rotated so the semicircle is directed inwardly of the group of members one of these portions masks the other with respect to the exterior of the control device and when rotated so the semicircle is directed outwardly of the group of members an opposite masking is produced.

9. The organization of claim 8 wherein the fuel portion is semicircular corresponding to the semicircle of the member and the poison portion is a relatively thin region adjacent and corresponding with the flat surface of the semicircle.

10. A control device for a nuclear reactor having a plurality of parallel longitudinally extending members the longitudinal axes of which are disposed in a circle, each of said members being generally cylindrical and being mounted for rotation about its major axis, each of said members containing a fuel and a poison with each of the members having these materials contained generally in different halfs of the transverse sectional area of the member, and means for rotating said members about their longitudinal axis to and from one extreme position wherein the poison portion of each of the members is directed inwardly of the group of members and another extreme position where said fuel portion is so directed.

11. The organization of claim 10 wherein means is disposed centrally of each of the cylindrical members providing a central passageway for coolant and means is disposed about each of said members providing an annular outer passageway for coolant.

12. An elongated control device of variable neutron absorbing capacity for a nuclear reactor adapted to be disposed in the active portion of a reactor core and operative to vary the neutron absorbing capacity of the device with respect to the exterior of the device, said device having longitudinally extending fuel portions and longitudinally extending poison portions with each fuel portion having associated therewith a poison portion thereby forming an associated pair and with the associated pairs being disposed in side-by-side relation about a central axis, and means for moving said associated pairs about an axis parallel with the longitudinal axis of the device to and from a position where the fuel is masked with the poison as viewed from the exterior of the device and a position where the poison is masked with the fuel as viewed from the exterior of the device.

13. An elongated control device for a nuclear reactor including a plurality of elongated fuel portions symmetrically disposed about a central axis and parallel with said axis, said fuel possessing considerable self-shielding, an elongated poison portion disposed adjacent and parallel with each fuel portion thereby forming pairs of fuel and poison portions, means for rotating one of said portions of each pair about an axis parallel with said central axis to and from a position where, outwardly of the control device, the fuel is effectively masked by the poison and a position where the poison is effectively masked by the fuel.

References Cited in the file of this patent
UNITED STATES PATENTS
2,852,458    Dietrich et al. _____ Sept. 16, 1958